United States Patent [19]

Allen, III

[11] Patent Number: 4,947,555

[45] Date of Patent: Aug. 14, 1990

[54] HAND HELD PITCH DIAMETER GAUGE

[75] Inventor: Charles H. Allen, III, Franklin Park, Pa.

[73] Assignee: Allen Gauge & Tool Company, Pittsburgh, Pa.

[21] Appl. No.: 310,050

[22] Filed: Feb. 10, 1989

[51] Int. Cl.$^5$ .............................................. G01B 3/40
[52] U.S. Cl. ..................... 33/199 R; 33/829
[58] Field of Search ................ 33/199 R, 199 B, 829, 33/531, 532, 629

[56] References Cited

U.S. PATENT DOCUMENTS

| | | | |
|---|---|---|---|
| 1,174,052 | 3/1916 | Burdick | 33/829 |
| 1,336,189 | 4/1920 | Bechler | 33/829 |
| 1,392,313 | 10/1921 | Fallow | 33/829 |
| 1,423,339 | 7/1922 | Ledell . | |
| 1,661,857 | 3/1928 | Schen | 33/199 R |
| 2,210561 | 8/1940 | Allen et al. | 33/199 R |
| 2,548,917 | 4/1951 | Spall | 33/174 |
| 2,826,822 | 3/1958 | Noviant | 33/199 R |
| 2,911,725 | 11/1959 | Sleigh | 33/199 R |
| 2,937,452 | 5/1960 | Man | 33/199 |
| 2,937,453 | 5/1960 | Peterson | 33/199 |
| 3,090,126 | 5/1963 | Kernoski | 33/199 R |
| 3,271,872 | 9/1966 | Heslin | 33/199 |
| 3,277,578 | 10/1968 | Johnson et al. | 33/199 |
| 3,537,184 | 11/1970 | Hearn | 33/199 |
| 3,638,324 | 2/1972 | Kaifesh | 33/199 R |
| 3,827,154 | 8/1974 | Kaifesh | 33/199 |
| 4,148,146 | 4/1979 | Holland | 33/199 R |
| 4,202,109 | 5/1980 | Schasteen | 33/199 |
| 4,335,518 | 6/1982 | Reef | 33/199 |
| 4,480,388 | 11/1984 | O'Brien | 33/199 |
| 4,524,524 | 6/1985 | Frank et al. | 33/147 |
| 4,553,337 | 11/1985 | Brewster | 33/199 |
| 4,567,670 | 2/1986 | Roulstone | 33/504 |
| 4,590,678 | 5/1986 | Arredondo | 33/199 |
| 4,672,750 | 6/1987 | Storace et al. | 33/199 |

OTHER PUBLICATIONS

Allen Gauge & Tool Company brochure-Catalog 85 (Date Unknown).

Primary Examiner—Thomas B. Will
Attorney, Agent, or Firm—Webb, Burden, Ziesenheim & Webb

[57] ABSTRACT

A pitch diameter gauge is disclosed which includes a gauge body and a first arm attached to the body and extending perpendicular outward therefrom. A second arm is attached to the body and extends perpendicular outward therefrom along the same side as the first arm and the second arm is spaced from and substantially parallel to the first arm. One of the arms is adjustable along the body and is lockable to the body in a desired location. A single ball contact is connected to one of the arms in a manner which permits movement thereof with respect to the other of the arms along a line perpendicular to both arms. The gauge also includes a base pivotally mounted near an end of the other of the arms and has a pair of spaced ball contacts mounted thereto along the surface opposite the associated arm. The single ball contact and pair of ball contacts are oriented either both toward or both away from each other. The pair of ball contacts is positioned along a line parallel to a longitudinal axis of the associated arm and the base is pivotable about an axis perpendicular to a plane parallel to the first and second arms. The pivot axis of the base is located in a line extending perpendicular to the first and second arms through the single ball contact and passes between the pair of ball contacts. Finally, the gauge includes an indicator mounted thereto and a moveable mechanism connecting the single ball contact to the indicator, whereby movement of the single ball contact is detected by the indicator.

58 Claims, 4 Drawing Sheets

HAND HELD PITCH DIAMETER GAUGE

BACKGROUND OF THE INVENTION

1. Field of the Invention

This invention relates to gauges and, more particularly, to gauges for measuring the pitch diameter of internally or externally threaded cylindrical or truncated cone-shaped members.

2. Description of the Prior Art

Threaded end connectors are commonly used to join together a variety of objects. If the threads are not formed within acceptable tolerances, the connection will not be as tight and sturdy as expected. This is a particular concern in certain industries, such as the petroleum industry which connects many lengths of pipe together underground and demands that the threaded connections not fail. In view of the criticality of these connections, inspectors routinely check a variety of characteristics about the threaded ends before the pipes are joined together and inserted into a drill hole.

One of the critical characteristics is the pitch diameter of an internally or externally threaded pipe, whether it is a straight or tapered threaded connection. The pitch diameter is particularly important since the pitch line is the location at which the adjacent threads actually touch each other and form the connection. The pitch line runs through the slope between the crest and the root of the threads. Various standards have been established for determining whether the pitch diameter of a particular diameter pipe and style of thread is acceptable. For example, the American Petroleum Institute has instituted a series of thread standards, such as standard 5B for pitch diameter. These standards tell the inspector the expected pitch diameter of a particular threaded connector at a particular distance from the end of the pipe. For example, L1 is the length back from the end of the pipe for measuring pitch diameter of an eight round thread and E1 is a similar standard for buttress threads. Measuring the threads at the end of the pipe is particularly important since that is the area most likely to be damaged.

A variety of devices have been used in the past for measuring pitch diameter. For example, the taper gauges sold by Allen Gauge & Tool Company, the assignee of the present application, under Model No. 5600 series and Model No. 5572 have been used to measure pitch diameter. The problem with using a taper gauge is that various errors in the taper or pitch of the threaded connector or even in the formation of the threads will, while being an acceptably formed thread, introduce errors in the actual pitch diameter measured. Helix error is also a particular problem with taper gauges using a two point contact. In addition, the ring and plug method has been used, but this arrangement is expensive and unwieldy to use, requiring separate, precisely machined ring/plug pairs for numerous thread configurations and diameters.

The three wire method of measuring pitch diameter is well known. In accordance with this method, a measurement is made of the distance of a chord through the center of a thread circle over three wires of exact and equal diameters which are placed into the thread groove. Subtraction of the known wire diameter from the measured reading gives the exact pitch diameter of the threaded member since the wires contact the slope of the threads at the pitch line. See, for example, U.S. Pat. Nos. 2,548,917, 2,937,452, 4,335,518 and 4,480,388. These arrangements provide a satisfactory measurement of the pitch diameter and will compensate for a variety of errors in the thread formation. However, these devices are unwieldy to use and do not readily lend themselves to portability. Other devices have been used to measure pitch diameter, including, the devices shown in U.S. Pat. Nos. 1,423,339, 1,661,857, 2,937,453, 3,271,872, 3,277,578, 3,537,184, 3,827,154, 4,202,109, 4,524,524, 4,553,337, 4,567,670, 4,590,678 and 4,672,750. However, each of these devices fails to correct one or more of the forms of error which could cause a deviation in the actual pitch diameter measured. Such errors include error of the taper of the thread, error in the pitch, error in thread height, error in thread form, and helix error in not properly spanning a perpendicular line across the thread. These errors are particularly pronounced in devices which contact the top of the threads, such as the devices shown in U.S. Pat. Nos. 4,524,524 and 4,567,670.

Accordingly, it is an object of the present invention to provide a gauge for measuring pitch diameter which will compensate for all of the possible errors identified above. It is also an object of the present invention to provide such a gauge which is portable and can be readily adjusted for measuring threaded connectors of various diameters, including large diameters. In addition, it is an object to provide such a gauge which can be used to measure the pitch diameter on an externally or internally threaded connector and on straight or tapered threads. It is also an object of the present invention to use the principles behind the three-wire method to contact the slopes of the threads and provide a precise and accurate measurement of the pitch diameter at the pitch line.

SUMMARY OF THE INVENTION

Accordingly, I have invented a pitch diameter gauge which includes a gauge body and a first arm attached to the body and extending perpendicular outward therefrom. The gauge also includes a second arm attached to the body and extending perpendicular outward therefrom along the same side as the first arm. The second arm is spaced from and substantially parallel to the first arm. One of the arms is adjustable along the body and includes means for locking the arm thereto in a desired location. A single ball contact is connected to one of the arms in a manner permitting movement with respect to the other of the arms in a plane parallel to said arms and along a line perpendicular to the arms. The gauge also includes a base pivotally mounted near an end of the other of the arms and has a pair of spaced ball contacts mounted thereto along a surface opposite the associated arm. The single ball contact and the pair of ball contacts point either toward each other or away from each other. The pair of ball contacts will be positioned along a line parallel to the longitudinal axis of its associated arm and the base is pivotable about an axis perpendicular to a plane parallel to the first and second arms. The pivot axis of the base is located in a line extending perpendicular to the first and second arms through the single ball contact and passing between the pair of ball contacts. The gauge also includes an indicator means mounted to the gauge and moveable means connecting the single ball contact to the indicator means. In this manner, movement of the single ball contact is detected by the indicator means.

In a preferred embodiment, one of the pair of ball contacts is additionally pivotally mounted to the base and has a pivot axis parallel to the pivot axis of the base. Such additional pivotal motion can be accomplished by a pivotal disc which carries that ball contact and is pivotally mounted within the base. The pivotal disc may have a concave depression therein along one edge and the base may include a set screw passing therethrough and extending within the concave depression. Alternatively, the base can be a pivotal disc pivotally mounted within a mounting base and carrying the pair of spaced ball contacts thereon. The mounting base would then be securely fastened to the other of said arms. In this arrangement, the pivotal disc may also have a concave depression and corresponding set screw passing through the mounting base, and the other of the pair of ball contacts may be mounted by a mounting shank in a bore larger than the mounting shank by a pivot pin or the like.

Either or both of the arms of the pitch diameter gauge can include stops thereon. Each stop can include a base mounted around an associated arm and one or more fingers carried by the base, with the fingers on one stop preferably oriented toward but offset from the fingers on the other stop.

In one embodiment of a pitch diameter gauge according to the present invention, the gauge includes a frame including an elongated frame member and a stationary arm connected to the frame member and extending perpendicular outward therefrom. An elongated adjustable arm is connected to and moveable along the elongated frame and includes means for locking the adjustable arm to the elongated frame member in a desired location. The adjustable arm extends perpendicular outward from the frame member from the same side as, parallel to and spaced from the stationary arm. The gauge also includes indicator means mounted to one of the arms. In addition, a single ball contact is connected by moveable means to the indicator means, such as by a spindle on a dial indicator, to permit movement in a plane parallel to said arms and along a line perpendicular to both arms. The gauge also includes a base pivotally mounted near an end of the other arm and carrying a pair of ball contacts as described above.

In another embodiment of a pitch diameter gauge in accordance with the present invention, the gauge includes a cylindrical body having a closed end and an outwardly biased, moveable center shaft. A moveable arm is fastened to the center shaft and moveable therewith, with said moveable arm extending perpendicular outward therefrom. The gauge also includes an adjustable arm connected to and moveable along the body and lockable in a desired location. A single ball contact is connected to an end of the moveable arm and is oriented in a plane parallel to both of the arms and along a line perpendicular to both arms. The adjustable arm has a base pivotally mounted thereto and a pair of spaced ball contacts mounted thereon as described above. Finally, the gauge in accordance with this embodiment includes an indicator means connected to and detecting movement of the moveable arm and the single ball contact mounted thereto as the center shaft moves within the body.

DESCRIPTION OF THE PREFERRED EMBODIMENTS

A first embodiment of a hand held pitch diameter gauge in accordance with the present invention is shown in FIGS. 1-9. The gauge includes an L-shaped frame 2 formed from an elongated vertical body or frame member 3 and a stationary arm 4 extending perpendicularly outward therefrom at about one end. The L-shaped frame 2 as shown is a solid piece having a uniform rectangular cross section, with opposed faces substantially wider than it is thick. The stationary arm 4 is preferably formed integral with the vertical frame 3. Mounted near the end of the stationary arm 4 opposite the vertical frame 3 on one face thereof by screws 5 or the like is a standard dial indicator 6. The dial indicator 6 carries a rotatable bezel ring 7 with numbers on its visible face and a bezel clamp 8 for locking the bezel ring 7 into place. The bezel ring 7 is moved to zero the needle 9 on the dial indicator 6 for each use. Extending outwardly from the housing of the dial indicator 6 at opposite sides thereof and perpendicular to the longitudinal axis of stationary arm 4 and parallel to its face are a removable spindle cap 10 and an attached stem 11. The stem 11 and spindle cap 10 are each hollow cylindrical members and contain therein an elongated cylindrical spindle 12 which extends through the dial indicator 6 and engages a rack mechanism therein.

Figures 1, 2:
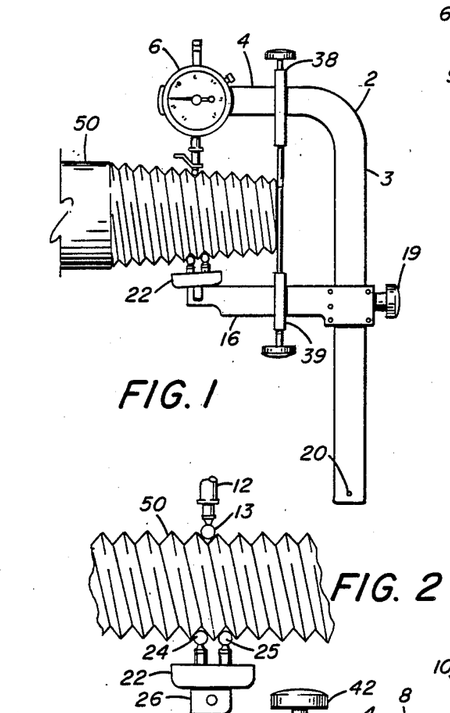
FIG. 1 is a side elevational view of a first embodiment of a pitch diameter gauge in accordance with the present invention positioned on the end of a tapered external thread.
FIG. 2 is an enlarged side view showing the thread contact of the three ball contacts of the gauge shown in FIG. 1.
Figure 3:
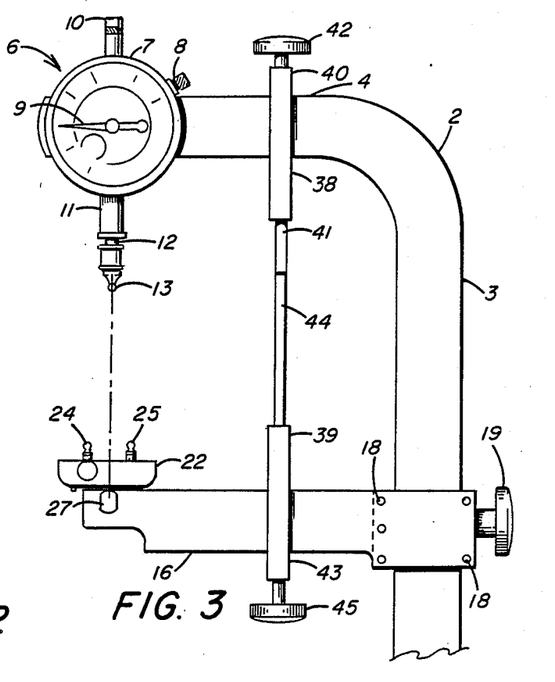
FIG. 3 is an enlarged side elevational view of the pitch diameter gauge shown in FIG. 1.
Figure 4:
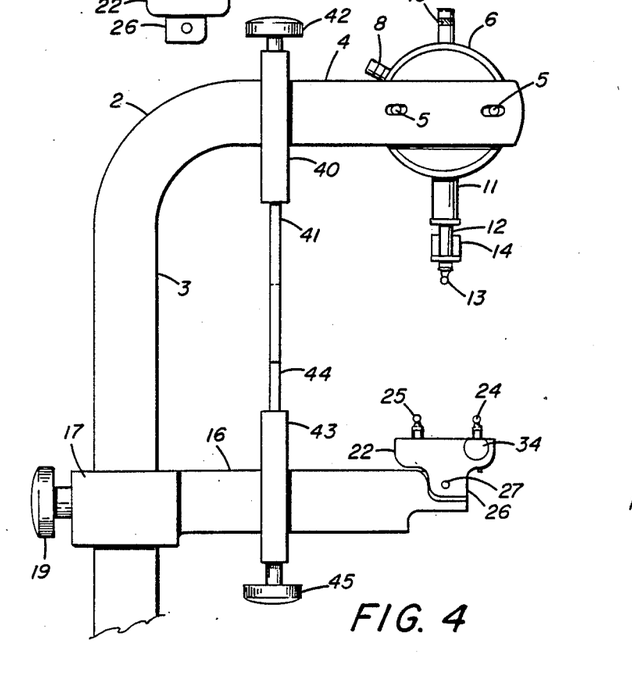
FIG. 4 is an elevational view of the opposite side of the pitch diameter gauge shown in FIG. 1.
Figure 5:
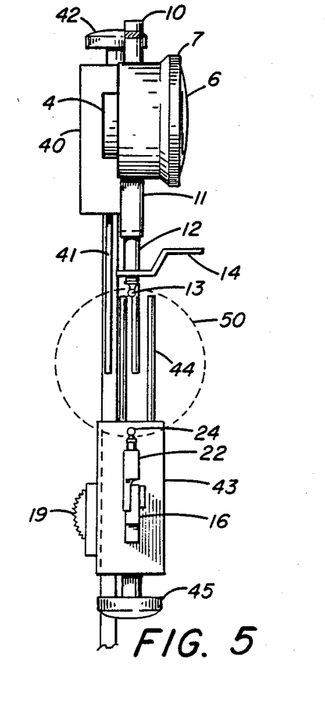
FIG. 5 is a front elevational view of the pitch diameter gauge shown in FIG. 1.
Figure 6:
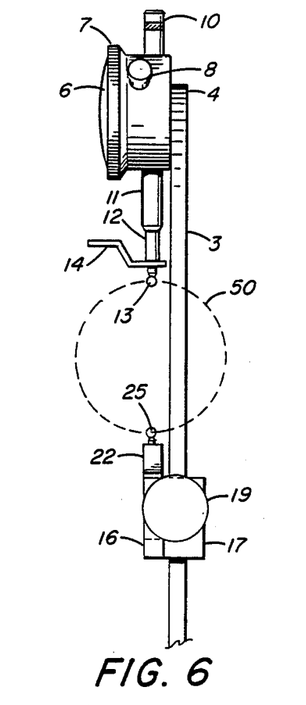
FIG. 6 is a rear elevational view of the pitch diameter gauge shown in FIG. 1 with the stops removed.

As is known in the art, movement of the spindle 12 back and forth through the dial indicator 6 causes the needle 9 to rotate accordingly. The spindle cap 10 is hollow and capped at one end and serves to cover the opposite end of the spindle 12 as it travels out of the housing of the dial indicator 6. The spindle 12 is biased outwardly through the stem 11 by a spring mechanism internal to the dial indicator 6. A single ball contact 13 is threadedly mounted to the end of the spindle 12 exterior of the stem 11 and a thumb lever 14 is connected to the spindle 12 immediately above the ball contact 13. The thumb lever 14 permits an operator to lift the ball contact 13 up when the gauge is placed on a thread being measured.

An elongated adjustable arm 16 is carried by the vertical frame 3 and extends outward therefrom along the same side as and substantially parallel to the stationary arm 4, but spaced therefrom. The adjustable arm 16 is a thin, rectangular plate which is positioned with one face adjacent a face of the vertical frame 3 and is held thereon by a U-shaped cap 17 which is positioned adjacent the opposite face and side portions of the vertical frame 3. The cap 17 is securely fastened to the adjustable arm 16 by a plurality of screws 18 or the like. Lock screw 19 extends through the cap 17 and contacts the vertical frame 3 to secure the adjustable arm 16 in place. The cap 17 and end of the adjustable arm 16 adjacent the vertical frame 3 should be closely spaced thereto, but permit movement of the adjustable arm 16 along the vertical frame 3 when lock screw 19 has been loosened. The adjustable arm 16 can be moved to a variety of positions along the vertical frame 3, to give various spacings from the stationary arm 4, by merely unlocking lock screw 19, moving the adjustable arm 16 to the desired location and tightening lock screw 19 against the vertical frame 3. Set screw 20 near the end of the vertical frame 3 opposite the stationary arm 4 prevents the adjustable arm 16 from sliding completely off the vertical frame 3, unless set screw 20 is removed.

Although not shown in the drawings, if the gauge shown in FIGS. 1-9 had a single ball contact mounted at the end of the adjustable arm 16 furthest from the vertical frame 3 and oriented toward the ball contact 13 on the spindle 12, then this would be equivalent to the Model No. 5600 series taper gauge sold by Allen Gauge & Tool Company. In accordance with the present invention, the single ball contact on the adjustable arm 16 is removed and a base member 22 carrying two spaced apart ball contacts 24, 25 is mounted to the end of the adjustable arm 16 opposite the vertical frame 3. As shown more clearly in FIGS. 7-9, the base 22 is a T-shaped plate having a flat upper surface 23 parallel to the longitudinal axis of the adjustable arm 16 and carrying ball contacts 24, 25 and a mounting flange 26 which is pivotally mounted to the adjustable arm 16 by a pivot screw 27 or the like. The flat upper surface 23 is oriented toward the single ball contact 13 carried by the spindle 12 of the dial indicator 6 mounted on the stationary arm 4. The mounting flange 26 fits into a mounting notch 28 on the end of the adjustable arm 16, with a face of the mounting flange 26 complementary with and contacting a face on the mounting notch 28.

The edge 29 of the mounting flange 26 adjacent the inner edge of the mounting notch 28 on the adjustable arm 16 is provided with an S-shaped curvature to match a corresponding S-shaped curvature on the adjacent edge 30 of mounting notch 28 on the adjustable arm 16. The pivot screw 27 extends substantially through the center of the mounting flange 26 of the base 22 and is mounted with its S-shaped edge 29 spaced a slight amount away from the S-shaped edge 30 of the mounting notch 28 on the adjustable arm 16. In this manner, the base 22 can freely pivot about the pivot screw 27, which has an axis of rotation perpendicular to the face surfaces of the adjustable arm 16. However, the slight spacing between the S-shaped edges 29, 30 permits only a modest amount of pivoting. Normally the base 22 will rest in contact with the adjustable arm 16 at either point A or point B shown in FIG. 7, with the upper surface 23 nearly parallel to the longitudinal axis of the adjustable arm 16 and will not flop around wildly prior to using the gauge. The center of the pivot screw 27, which defines the axis of rotation of the base 22 thereabout, is perpendicularly opposite to the single ball contact 13 carried by the spindle 12 on an imaginary line passing therethrough and between the pair of ball contacts 24, 25, perpendicular to both the adjustable arm 16 and the stationary arm 4, and in a plane parallel to said arms 4 and 16.

Figure 7:
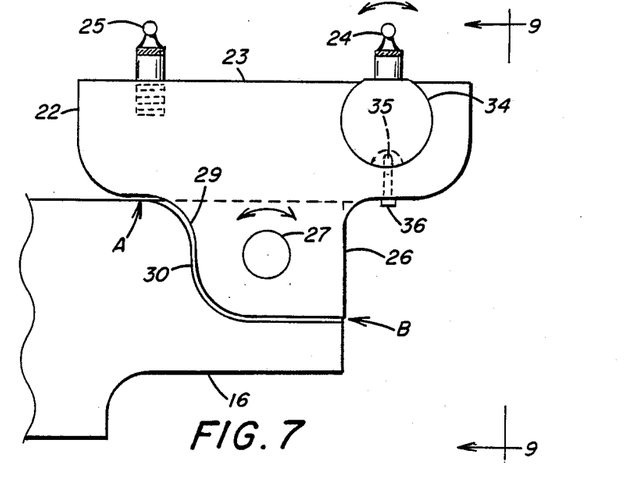
FIG. 7 is an enlarged side elevational view of one end of the adjustable arm of the pitch diameter gauge shown in FIG. 1.
Figure 8:
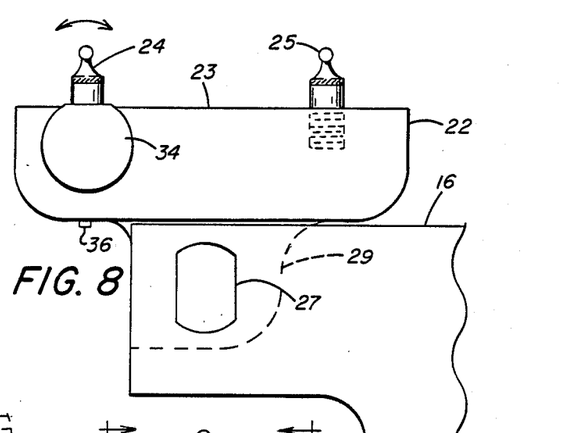
FIG. 8 is an elevational view of the opposite side of the end of the adjustable arm shown in FIG. 7.
Figure 9:
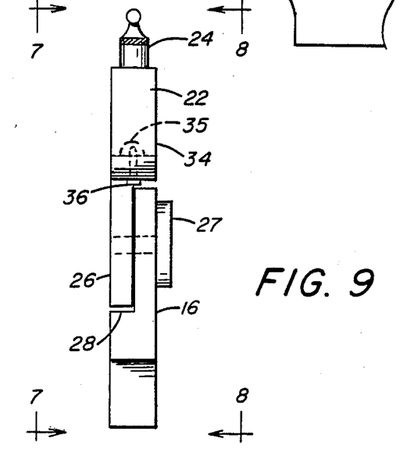
FIG. 9 is a side elevational view of the adjustable arm shown in FIG. 7.

Continuing to refer to FIGS. 7-9, it is seen that one of the ball contacts 25 on the base 22 is rigidly secured thereto by threads or the like. The other ball contact 24 is threaded into a pivotal disc 34 which is in turn inserted into the base 22 to permit free rotation therein. The pivotal disc 34 is a flat plate which resembles a circle having its upper portion removed with a line parallel to the top surface 23 of the base 22. The edge defined by the removed portion receives ball contact 24. The pivotal disc 34 should be larger than a half circle to keep the disc from moving out through the flat surface 23 of the base 22. The pivotal disc 34 is positioned snugly within a corresponding opening extending through the flat parallel faces of the base 22. A ridge and groove arrangement could be used additionally to hold the pivotal disc 34 within the base 22.

A concave depression 35 is provided in the bottom inside edge surface of the pivotal disc 34, preferably opposite ball contact 24. A set screw 36 extends through the base 22 and into the concave depression 35 formed in the pivotal disc 34. The concave depression 35 is wider than the diameter of the set screw 36 and permits the pivotal disc 34 to rock back and forth about its circular center within the base 22, and about an axis of rotation parallel to that of the base 22. In addition, the set screw 36 keeps the pivotal disc 34 secured within the base 22 and prevents it from sliding out therefrom. The amount of rotation permitted to the pivotal disc 34 and, accordingly, to ball contact 24, is determined by the extent to which the set screw 36 is threaded into the concave depression 35.

The pitch diameter gauge shown in FIGS. 1-9 can have, optionally, stops for precisely positioning the gauge on the end of a threaded pipe. The stationary arm 4 carries an adjustable upper stop 38 and the adjustable arm 16 carries an adjustable lower stop 39. Each stop is similar in configuration. The upper stop 38 includes a base 40 slideably mounted around the stationary arm 4 and a pair of downwardly extending, spaced apart fingers 41. Lock screw 42 extends through the base 40 and provides for tight positioning of the upper stop 38 on the stationary arm 4 at a desired location. Similarly, the lower stop 39 has a base 43 slideably mounted around the adjustable arm 16 and a pair of upwardly extending, spaced apart fingers 44 carried by the base 43. Lock screw 45 extends through the base 43 of the lower stop 39 and provides for tight positioning of the lower stop 39 on the adjustable arm 16 in a desired location. The fingers 41 on the upper stop 38 are offset from the fingers 44 on the lower stop 39 to provide an overlapping arrangement when the adjustable arm 16 is positioned close to the stationary arm 4. This arrangement is shown clearly in FIG. 5.

It is important that a perpendicular line through the spindle 11 and the single ball contact 13 connected thereto, and perpendicular to the adjustable arm 16 and stationary arm 4, extend through the center of the pivot screw 27 which defines the axis of rotation of the base 22 carrying ball contacts 24, 25. Moreover, the three ball contacts 13, 24 and 25 should lie in a plane parallel to the faces of the vertical frame 3, stationary arm 4 and adjustable arm 16. This is shown clearly in FIGS. 3 and 6. In addition, ball contact 24 and ball contact 25 on the base 22 are spaced apart a multiple of the width of the threads of a particular threaded connection being measured. It is preferable to have these ball contacts 24 and 25 separated by only one thread width, as shown in FIG. 2, so that the pitch diameter can be measured as accurately as possible. By providing ball contacts with a proper diameter for the thread being measured, as is well known in the art, the three ball contacts in the pitch diameter gauge shown in FIGS. 1-9 will precisely measure the pitch diameter in accordance with the principles of the three wire contact method of measurement.

By providing the adjacent pair of ball contacts 24, 25 carried by the adjustable arm 16 on a base 22 that pivots, any errors in taper on the thread being measured will be compensated for and will not change the actual measured pitch diameter. In addition, by providing one of the pair of ball contacts (i.e., ball contact 24) with a pivotal mounting, errors in the pitch of the thread being measured will be compensated for. By having this dual rocking motion, then the pair of ball contacts 24, 25 will seek out and contact the true pitch line of the thread irrespective of any errors.

Figure 10:
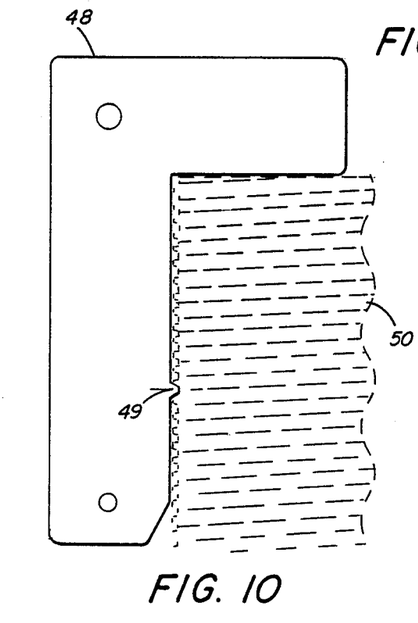
FIG. 10 is a plan view of an L-gauge positioned on a threaded connector.
Figures 11, 12, 13, 14, 15, 16:
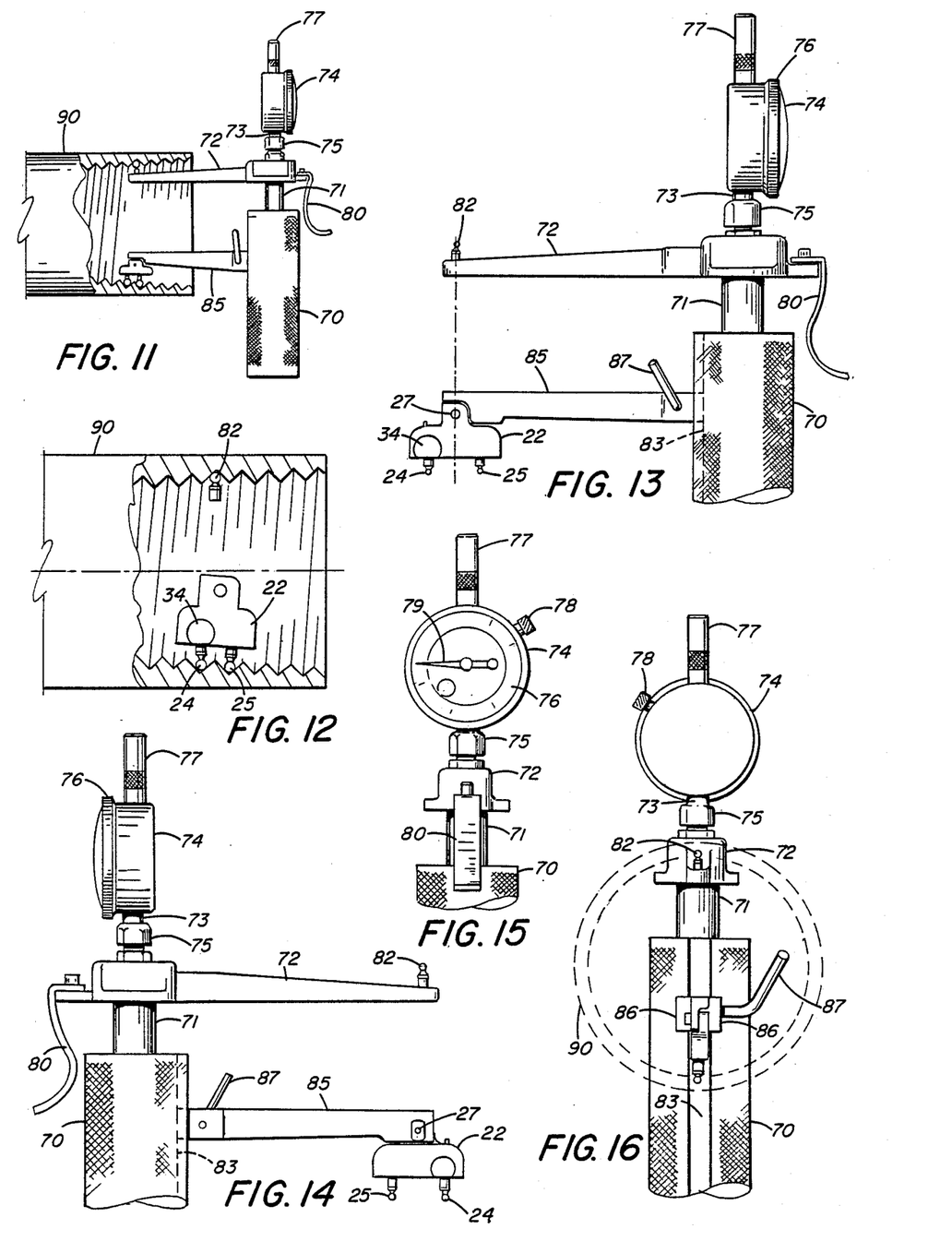
FIG. 11 is a side elevational view of a second embodiment of a pitch diameter gauge in accordance with the present invention positioned on the end of a tapered internal thread.
FIG. 12 is an enlarged side view showing the thread contact of the three ball contacts of the gauge shown in FIG. 11.
FIG. 13 is an enlarged side elevational view of the pitch diameter gauge shown in FIG. 11.
FIG. 14 is an elevational view of the opposite side of the pitch diameter gauge shown in FIG. 11.
FIG. 15 is a rear elevational view of the pitch diameter gauge shown in FIG. 11.
FIG. 16 is a front elevational view of the pitch diameter gauge shown in FIG. 11.
Figure 17:
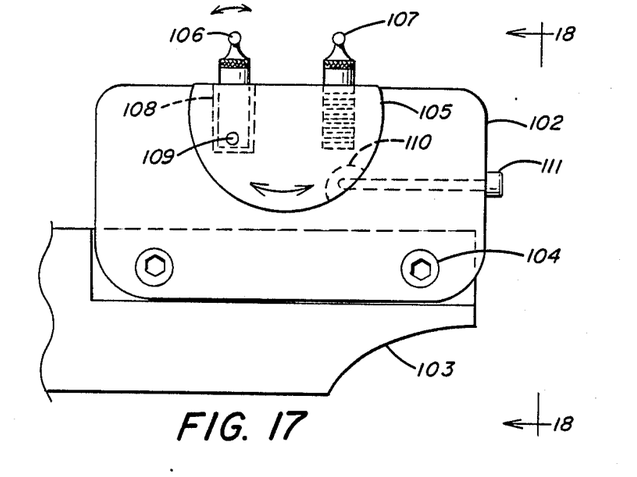
FIG. 17 is a side elevational view of an alternative arrangement for mounting the pair of ball contacts to the end of the adjustable arm.
Figure 18:
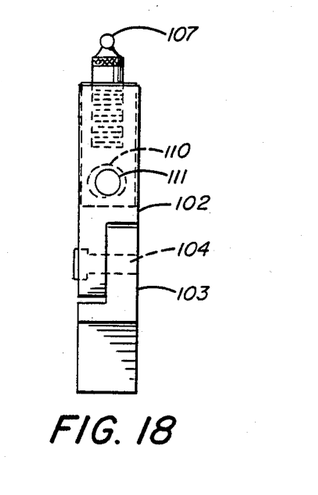
FIG. 18 is a front elevational view of the arrangement shown in FIG. 17.
Figure 19:
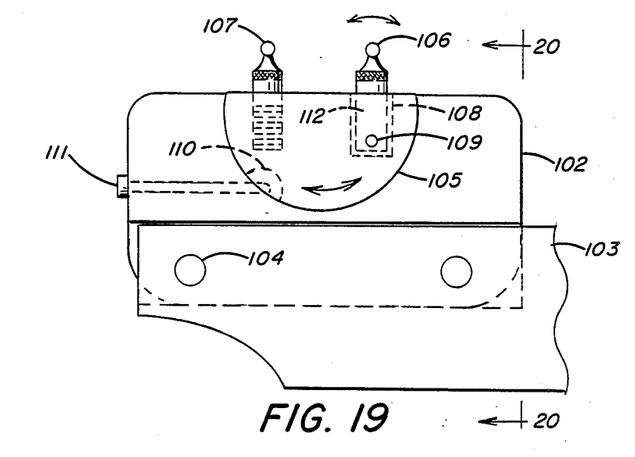
FIG. 19 is the opposite side elevational view of the arrangement shown in FIG. 17.
Figure 20:
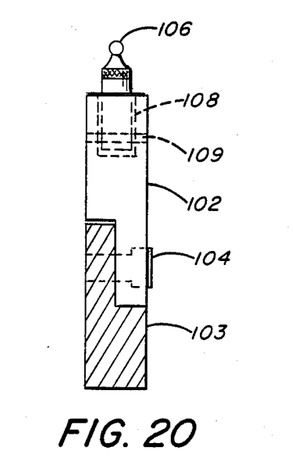
FIG. 20 is a section taken along lines 20—20 in FIG. 19.

Normally pitch diameter is measured at a precise depth or location from the end of the threaded connector in accordance with the established standards. FIG. 10 shows one mechanism, referred to as an L-gauge, for precisely locating this distance. The L-gauge 48 is essentially a flat, L-shaped plate which has a tab 49 located along one arm at the precise location desired. An inspector would place the L-gauge 48 with the other arm (without the tab 49) at the top of the pipe 50 and rotate it until the tab 49 dropped into one of the threads. The inspector would then mark this location with a pencil or the like and use that mark for positioning the single ball contact 13 on the spindle 12. The adjustable arm 16 on the pitch diameter gauge shown in FIGS. 1-9 would be moved to a desired location and the inspector would use a vernier, measurement standard, or the like for setting the distance between the arms. The bezel ring 7 on the dial indicator 6 would be zeroed in a known manner. The inspector would then position the single ball contact 13 at the desired point, and then position the pair of ball contacts 24, 25 on the threads opposite the single ball contact 13. This is shown clearly in FIG. 1. Since the inspector zeroed the dial indicator 6 prior to inserting the gauge on the pipe 50 at the proper location, any deviations of the pitch diameter from the expected diameter will be shown by movement of the needle 9 from zero. As shown in FIG. 1, the upper stop 38 and lower stop 39 on the stationary arm 4 and adjustable arm 16, respectively, can also be used to easily set the distance for positioning the ball contacts to measure the proper pitch diameter.

The arrangement shown in FIGS. 1-9 has the single ball contact 13 oriented toward the opposing pair of ball contacts 24, 25 on the base 22. By this arrangement, pitch diameter can be measured on the outer surface of a threaded connector. However, it is also possible to rotate the dial indicator 6 and spindle 12 and single ball contact 13 by 180° and also rotate the base 22 by 180° from the positions shown in FIGS. 1-9. The single ball contact 13 would be pointed away from the pair of ball contacts 24, 25 and the pair of ball contacts 24, 25 would be pointed away from the dial indicator 6. In this manner, the diameter of an internal threaded connector could be measured by following the identical process set forth above. However, the only limitation on this is that that arrangement would not be practical with smaller diameter connectors since the dial indicator 6 would be located within the connector. Of course, however, this arrangement would be perfectly adequate for measuring the inner pitch diameter of relatively large pipes. It is anticipated by the inventor that the arrangement shown in FIGS. 1-9 will be primarily useful for measuring outside pitch diameters, but the use of this device for measuring inside pitch diameters is also encompassed by the present invention. While the fingers of the stops 38, 39 are oriented toward each other, which is needed for external measurements, if the gauge shown in FIGS. 1-9 were modified for internal measurements, then the stops 38, 39 would be rotated 180° from that shown and the fingers 41, 44 would be oriented away from each other. Moreover, it is also within the scope of this invention to place the dial indicator 6 and single ball contact 13 on the adjustable arm 16 and place the pivotal base 22 and pair of ball contacts 24, 25 on the stationary arm 4. Moreover, it is possible to use a pair of adjustable arms on the vertical frame 3, although it is preferred to use one stationary arm and one adjustable arm since one adjustable arm is adequate for changing the distance between the arms for various measurements.

A second embodiment of a hand held pitch diameter gauge is shown in FIGS. 11-16. The gauge includes a substantially cylindrical body 70 having a closed end and an outwardly biased, moveable center shaft 71 extending through an upper surface thereof. Together body 70 and center shaft 71 form a gauge body. The body 70 is typically held by an operator's hand and, therefore, the outer surface is knurled or the like to increase the gripping action. Ar elongated moveable arm 72 is securely fastened to the top of the center shaft 71 by a threaded connection or the like, and the spindle of a standard dial indicator 74 is connected to the center shaft 71 by a collet 75 surrounding the stem 73. The moveable arm 72 extends outward perpendicular to both the center shaft 71 and the body 70 of the gauge. As with the dial indicator shown in FIGS. 1-9, the dial indicator 74 in FIGS. 11-16 includes a bezel ring 76 carrying a plurality of numbers, a spindle cap 77, a bezel clamp 78, and a rotating needle 79 indicating movement of the spindle relative to the rack within the dial indicator 74. A thumb lever 80 is attached to the end of the moveable arm 72 adjacent the center shaft 71 and permits the operator to manually move the center shaft 71 into the body 70 of the gauge. Since the center shaft 71 is normally biased out of the body 70, removing pressure on the thumb lever 80 will let the center shaft 71 move outwardly.

The end of the moveable arm 72 furthest from the center shaft 71 carries a single ball contact 82 threaded or otherwise affixed thereto and directed upwardly away from the body 70 as shown. The body 70 of the gauge also includes a dovetail groove 83 extending into the surface of the body 70 parallel to the center shaft 71 and perpendicular to and aligned with the movable arm 72. An adjustable arm 85 is mounted within the dovetail groove 83 and extends outwardly from the body 70 perpendicular thereto and parallel and in line with the moveable arm 72. The adjustable arm 85 has a pair of flanges 86 at the end adjacent the body 70 and a lock lever 87 extends through the flanges 86. By rotating the lock lever 87 in one direction, the flanges 86 are expanded outwardly to securely contact the interior of the dovetail groove 83. This locks the adjustable arm 85 in place on the body 70. By rotating the lock lever 87 in the opposite direction, the pressure on the flanges 86 is removed and the adjustable arm 85 can be moved to any other desired location along the length of the dovetail groove 83 and thereafter locked in place.

While not shown in FIGS. 11-16, if the adjustable arm 85 had mounted at its end opposite the gauge body 70 a single ball contact extending in the opposite direction of the ball contact 82 on the moveable arm 72, such an arrangement would be identical to the Model 5572 taper gauge sold by Allen Tool & Gauge Company. In accordance with the present invention, the single ball contact on the adjustable arm 85 is replaced by the base 22 carrying a pair of spaced ball contacts 24, 25 and pivotally mounted to the adjustable arm 85 in the arrangement described above in detail in connection with FIGS. 1-9. The only difference is that the base 22 and pair of ball contacts 24, 25 are mounted to be oriented away from the single contact 85 on the moveable arm 72 and, therefore, this arrangement is adapted for measuring the inside diameter of a threaded connection on a pipe 90 or the like. This is more clearly shown in FIGS. 11 and 12.

The arrangement shown in FIGS. 11-16 could be used for measuring the outside diameter of a threaded connection by merely rotating the single ball contact 82 and the pair of ball contacts 24, 25 by 180° so that they are facing each other and are aligned with each other. Similar to the arrangement shown in FIGS. 1-9, the pivot point of base 22 is located perpendicularly opposite to the single ball contact 82 on the moveable arm 72 and all of the ball contacts are located in a plane parallel to the longitudinal axis of the moveable arm 72 and adjustable arm 85. Moreover, the base 22 could be mounted to the moveable arm 72 and the single ball contact 82 could be mounted to the adjustable arm 85.

The pitch diameter gauge shown in FIGS. 11-16 is used to measure pitch diameter of a threaded connection in much the same way as the gauge described above in FIGS. 1-9. The adjustable arm 85 is moved to a particular spacing from the moveable arm 72. The single ball contact 82 is positioned or the thread of the pipe 90 at a prescribed location and the pair of ball contacts 24, 25 is positioned on the threads opposite thereto. See FIGS. 11 and 12. Rather than have the movement of the single ball contact 82 feed directly to the spindle on the dial indicator 74, the motion of the single ball contact 82 is transmitted through the moveable arm 72 to the spindle, which causes the needle 79 of the dial indicator 74 to rotate and indicate deviations from the prescribed distance setting between the moveable arm 72 and the adjustable arm 85. While not shown in FIGS. 11-16, adjustable stops could be provided on the moveable arm 72 and the adjustable arm 85 similar to the upper and lower stops provided on the gauge shown in FIGS. 1-9. Of course the fingers on the stops in both embodiments would extend in the same general direction as the direction of the single ball contact or pair of ball contacts. All of the advantages of providing a pair of adjacent ball contacts on a pivotal base and providing one of the pair of ball contacts on its own pivotal mechanism are found in the embodiment of the pitch diameter gauge shown in FIGS. 11-16 for the same reasons described above in connection with the gauge shown in FIGS. 1-9.

An alternative embodiment for mounting the pair of ball contacts to the end of an adjustable arm, stationary arm or moveable arm is shown in FIGS. 17-20. In accordance with this arrangement, a mounting base 102 is securely fastened to the arm 103 by screws 104 or the like along overlapping flanged areas. A pivotal disc 105, similar to the pivotal disc 34 shown in FIGS. 7 and 8, is provided in the mounting base 102 and serves as a base to carry both of the ball contacts 106, 107. One ball contact 107 is securely fixed to the pivotal disc 105. The other ball contact 106 is positioned in a bore 108 which is slightly larger than the outer diameter of its mounting shank 112 and pivotally mounted thereto by a pivot pin 109 or the like. The pivot pin 109 and, hence, the axis of rotation of ball contact 106, is perpendicular to the opposed faces of the pivotal disc 105 and, also, perpendicular to the longitudinal axis of the arm 103. A concave depression 110 is provided along one side of the pivotal disc 105 and set screw 111 extends through one side of the mounting base 102 and into the concave depression 110.

The pivotal disc 105 can rock back and forth about its circular center in a plane parallel to the faces of the mounting base 102 and arm 103 to permit rotation of both ball contacts 106, 107. This rotational motion will correct for errors in taper of the thread. In addition, ball contact 107 can freely rock back and forth within bore 108 about a line perpendicular to the faces of the pivotal disc 105 due to the clearance therebetween and the pivotal connection at the pivot pin 109. This rocking of ball contact 106 will correct for errors in thread pitch. While this arrangement functions similarly to that shown in FIGS. 7 and 8, it should be noted that the arrangement in FIGS. 17-20 provides for closer spacing of the pair of ball contacts which would be required for measurements of pitch diameter of finer threads. The arrangement shown in FIGS. 7 and 8 is more suitable for coarse threads since it would be difficult to space the pair of ball contacts as close together as for example, ⅛ inch.

Having described above the presently preferred embodiments of this invention, it is to be understood that it may be otherwise embodied within the scope of the appended claims.

I claim

1. A pitch diameter gauge comprising:
   a. a gauge body;
   b. a first arm attached to said body and extending perpendicular outward therefrom;

c. a second arm attached to said body and extending perpendicular outward therefrom along a same side as said first arm, with said second arm spaced from and substantially parallel to said first arm, and with one of said first arm or said second arm adjustable along said body and including means for locking said adjustable arm to said body in a desired location;

d. a single ball contact connected to one of said arms in a manner which permits movement of said single ball with respect to the other of said arms in a plane parallel to said arms and along a line perpendicular to both arms;

e. a base pivotally mounted near an end of the other of said arms and having a pair of spaced ball contacts mounted thereto along a surface opposite said associated arm, with said single ball contact and said pair of ball contacts either both oriented toward each other or both oriented away from each other, with said pair of ball contacts positioned along a line parallel to a longitudinal axis of said associated arm, with said base pivotable about an axis perpendicular to a plane parallel to said first and second arms, and with said pivot axis of said base located in a line extending perpendicular to said first and second arms through said single ball contact and passing between said pair of ball contacts;

f. an indicator means mounted to said gauge; and g. moveable means connecting said single ball contact to said indicator means, whereby movement of said single ball contact is detected by said indicator means.

2. The pitch diameter gauge of claim 1 wherein one of said pair of ball contacts is pivotally mounted to said base and has a pivot axis parallel to the pivot axis of said base.

3. The pitch diameter gauge of claim 2 wherein said one of said pair of ball contacts is secured to a pivotal disc which is pivotally mounted within said base.

4. The pitch diameter gauge of claim 3 wherein said pivotal disc has a concave depression therein along one edge thereof and said base includes a set screw passing therethrough and extending within said concave depression, with said concave depression having a diameter greater than that of said set screw.

5. The pitch diameter gauge of claim 1 wherein said base is a pivotal disc which is pivotally mounted within a mounting base and has said pair of spaced ball contacts mounted thereto, with said mounting base securely fastened to the other of said arms.

6. The pitch diameter gauge of claim 5 wherein said pivotal disc has a concave depression therein along one edge thereof and said mounting base includes a set screw passing therethrough and extending within said concave depression, with said concave depression having a diameter greater than that of said set screw.

7. The pitch diameter gauge of claim 5 wherein one of said pair of ball contacts is pivotally mounted to said pivotal disc and has a pivot axis parallel to the pivot axis of said pivotal disc.

8. The pitch diameter gauge of claim 7 wherein said one of said pair of ball contacts is pivotally mounted by a mounting shank within a bore in said pivotal disc, said bore having a diameter larger than the diameter of said mounting shank.

9. The pitch diameter gauge of claim 8 wherein said one of said pair of ball contacts is mounted to a pivot pin in said bore having an axis parallel to the pivot axis of said pivotal disc.

10. The pitch diameter gauge of claim 1 wherein said base is pivotally mounted to the adjustable arm of said first and second arms.

11. The pitch diameter gauge of claim 1 wherein said indicator means is mounted to one of said arms.

12. The pitch diameter gauge of claim 11 wherein said indicator is a dial indicator having a stem and a moveable spindle within said stem, with said single ball contact connected to said moveable spindle, and with said moveable spindle extending perpendicular to said associated arm.

13. The pitch diameter gauge of claim 1 wherein said first arm is adjustable along said body and said second arm is moveable with respect to said body, and said indicator means is connected to and detects movement of said second arm, and said single ball contact is connected to said second arm.

14. The pitch diameter gauge of claim 1 further including a first stop moveably mounted to one of said arms and including means for releasably locking said first stop to said arm.

15. The pitch diameter gauge of claim 14 further including a second stop moveably mounted to the other of said arms and including means for releasably locking said second stop to said arm.

16. The pitch diameter gauge of claim 15 wherein each of said stops include a base mounted around an associated arm and one or more fingers carried by said base.

17. The pitch diameter gauge of claim 16 wherein each of said stops include a plurality of fingers, with the fingers on one stop oriented toward but offset from the fingers on the other stop.

18. A pitch diameter gauge comprising:

a. a frame including an elongated frame member and a stationary arm connected to said frame member and extending perpendicular outward therefrom;

b. an elongated adjustable arm connected to and moveable along said elongated frame member and including means for locking said adjustable arm to said elongated frame member in a desired location, with said adjustable arm extending perpendicular outward from said elongated frame member from the same side as, parallel to and spaced from said stationary arm;

c. indicator means mounted to one of said arms;

d. a single ball contact connected by moveable means to said indicator means to permit movement in a plane parallel to said arms and along a line perpendicular to both arms, whereby movement of said single ball contact is detected by said indicator means; and e. a base pivotally mounted near an end of the other of said arms and having a pair of spaced ball contacts mounted thereto along a surface opposite said associated arm, with said single ball contact and said pair of ball contacts either both oriented toward each other or both oriented away from each other, with said pair of ball contacts positioned along a line parallel to a longitudinal axis of said associated arm, with said base pivotable about an axis perpendicular to a plane parallel to said first and second arms, and with said pivot axis of said base located in a line extending perpendicular to said first and second arms through said single ball contact and passing between said pair of ball contacts.

19. The pitch diameter gauge of claim 18 wherein one of said pair of ball contacts is pivotally mounted to said base and has a pivot axis parallel to the pivot axis of said base.

20. The pitch diameter gauge of claim 19 wherein said one of said pair of ball contacts is secured to a pivotal disc which is pivotally mounted within said base.

21. The pitch diameter gauge of claim 20 wherein said pivotal disc has a concave depression therein along one edge thereof and said base includes a set screw passing therethrough and extending within said concave depression, with said concave depression having a diameter greater than that of said set screw.

22. The pitch diameter gauge of claim 18 wherein said base is a pivotal disc which is pivotally mounted within a mounting base and has said pair of spaced ball contacts mounted thereto, with said mounting base securely fastened to the other of said arms.

23. The pitch diameter gauge of claim 22 wherein said pivotal disc has a concave depression therein along one edge thereof and said mounting base includes a set screw passing therethrough and extending within said concave depression, with said concave depression having a diameter greater than that of said set screw.

24. The pitch diameter gauge of claim 22 wherein one of said pair of ball contacts is pivotally mounted to said pivotal disc and has a pivot axis parallel to the pivot axis of said pivotal disc.

25. The pitch diameter gauge of claim 24 wherein said one of said pair of ball contacts is pivotally mounted by a mounting shank within a bore in said pivotal disc, said bore having a diameter larger than the diameter of said mounting shank.

26. The pitch diameter gauge of claim 25 wherein said one of said pair of ball contacts is mounted to a pivot pin in said bore having an axis parallel to the pivot axis of said pivotal disc.

27. The pitch diameter gauge of claim 18 wherein said base is pivotally mounted to the adjustable arm.

28. The pitch diameter gauge of claim 18 wherein said indicator is a dial indicator having a stem and a moveable spindle within said stem, with said single ball contact connected to said moveable spindle, and with said moveable spindle extending perpendicular to said associated arm.

29. The pitch diameter gauge of claim 19 wherein said single ball contact and said pair of spaced ball contacts are oriented toward each other.

30. The pitch diameter gauge of claim 18 further including a first stop moveably mounted to one of said adjustable arm and stationary arm and including means for releasably locking said first stop to said arm.

31. The pitch diameter gauge of claim 30 further including a second stop moveably mounted to the other of said stationary arm and adjustable arm and including means for releasably locking said second stop to said arm.

32. The pitch diameter gauge of claim 31 wherein each of said stops include a base mounted around an associated arm and one or more fingers carried by said base.

33. The pitch diameter gauge of claim 32 wherein each of said stops include a plurality of fingers, with the fingers on one stop oriented toward but offset from the fingers on the other stop.

34. A pitch diameter gauge comprising:
 a. a cylindrical body having a closed end and an outwardly biased, moveable center shaft;
 b. a moveable arm fastened to said center shaft and moveable therewith, said moveable arm extending perpendicular outward therefrom;
 c. an adjustable arm connected to and moveable along said body and including means for locking said adjustable arm to said body in a desired location, with said adjustable arm extending perpendicular outward from said body from the same side as, parallel to and spaced from said moveable arm;
 d. a single ball contact connected to an end of said moveable arm and oriented in a plane parallel to said arms and along a line perpendicular to both of said arms;
 e. a base pivotally mounted near an end of said adjustable arm and having a pair of spaced ball contacts mounted thereto along a surface opposite said adjustable arm, with said sing)e ball contact and said pair of ball contacts either both oriented toward each other or both oriented away from each other, with said pair of ball contacts positioned along a line parallel to a longitudinal axis of said adjustable arm, with said base pivotable about an axis perpendicular to a plane parallel to said arms, and with said pivot axis of said base located in a line extending perpendicular to said arms through said single ball contact and passing between said pair of ball contacts; and
 f. indicator means connected to and detecting movement of said moveable arm and said single ball contact mounted thereto as said center shaft moves within said body.

35. The pitch diameter gauge of claim 34 where one of said pair of ball contacts is pivotally mounted to said base and has a pivot axis parallel to the pivot axis of said base.

36. The pitch diameter gauge of claim 35 wherein said one of said pair of ball contacts is secured to a pivotal disc which is pivotally mounted within said base.

37. The pitch diameter gauge of claim 36 wherein said pivotal disc has a concave depression therein along one edge thereof and said base includes a set screw passing therethrough and extending within said concave depression, with said concave depression having a diameter greater than that of said set screw.

38. The pitch diameter gauge of claim 34 wherein said base is a pivotal disc which is pivotally mounted within a mounting base and has said pair of spaced ball contacts mounted thereto, with said mounting base securely fastened to said adjustable arm.

39. The pitch diameter gauge of claim 38 wherein said pivotal disc has a concave depression therein along one edge thereof and said mounting base includes a set screw passing therethrough and extending within said concave depression, with said concave depression having a diameter greater than that of said set screw.

40. The pitch diameter gauge of claim 38 wherein one of said pair of ball contacts is pivotally mounted to said pivotal disc and has a pivot axis parallel to the pivot axis of said pivotal disc.

41. The pitch diameter gauge of claim 40 wherein said one of said pair of ball contacts is pivotally mounted by a mounting shank within a bore in said pivotal disc, said bore having a diameter larger than the diameter of said mounting shank.

42. The pitch diameter gauge of claim 41 wherein said one of said pair of ball contacts is mounted to a pivot pin in said bore having an axis parallel to the pivot axis of said pivotal disc.

43. The pitch diameter gauge of claim 34 wherein said base is pivotally mounted to the adjustable arm.

44. The pitch diameter gauge of claim 34 wherein said indicator is a dial indicator having a stem and a moveable spindle within said stem, with said single ball contact connected to said moveable spindle, and with said moveable spindle extending perpendicular to said associated arm.

45. The pitch diameter gauge of claim 35 wherein said single ball contact and said pair of spaced ball contacts are oriented away from each other.

46. The pitch diameter gauge of claim 34 further including a first stop moveably mounted to one of said adjustable arm and stationary arm and including means for releasably locking said first stop to said arm.

47. The pitch diameter gauge of claim 46 further including a second stop moveably mounted to the other of said stationary arm and adjustable arm and including means for releasably locking said second stop to said arm.

48. The pitch diameter gauge of claim 47 wherein each of said stops include a base mounted around an associated arm and one or more fingers carried by said base.

49. The pitch diameter gauge of claim 48 wherein each of said stops include a plurality of fingers, with the fingers on one stop oriented toward but offset from the fingers on the other stop.

50. An adjustable arm adapted for mounting on a taper gauge or the like having a gauge body and a gauge arm attached thereto and extending outwardly therefrom and carrying a single ball contact thereon, said adjustable arm comprising an elongated arm member having at one end thereof means for locking said arm member to said gauge body in a desired location and having at the other end thereof a base pivotally mounted thereto, with said base having a pair of spaced ball contacts mounted thereto along a surface opposite said elongated arm member, with said pair of ball contacts positioned along a line parallel to a longitudinal axis of said elongated arm member and with said base pivotable about an axis perpendicular to a plane parallel to said adjustable arm and said gauge arm, and with said pivot axis of said base located in a line extending perpendicular to said arms through said single ball contact and passing between said pair of ball contacts.

51. The adjustable arm of claim 50 wherein one of said pair of ball contacts is pivotally mounted to said base and has a pivot axis parallel to the pivot axis of said base.

52. The adjustable arm of claim 51 wherein said one of said pair of ball contacts is secured to a pivotal disc which is pivotally mounted within said base.

53. The adjustable arm of claim 52 wherein said pivotal disc has a concave depression therein along one edge thereof and said base includes a set screw passing therethrough and extending within said concave depression, with said concave depression having a diameter greater than that of said set screw.

54. The adjustable arm of claim 50 wherein said base is a pivotal disc which is pivotally mounted within a mounting base and has said pair of spaced ball contacts mounted thereto, with said mounting base securely fastened to said adjustable arm.

55. The adjustable arm of claim 54 wherein said pivotal disc has a concave depression therein along one edge thereof and said mounting base includes a set screw passing therethrough and extending within said concave depression, with said concave depression having a diameter greater than that of said set screw.

56. The adjustable arm of claim 54 wherein one of said pair of ball contacts is pivotally mounted to said pivotal disc and has a pivot axis parallel to the pivot axis of said pivotal disc.

57. The adjustable arm of claim 56 wherein said one of said pair of ball contacts is pivotally mounted by a mounting shank within a bore in said pivotal disc, said bore having a diameter larger than the diameter of said mounting shank.

58. The adjustable arm of claim 57 wherein said one of said pair of ball contacts is mounted to a pivot pin in said bore having an axis parallel to the pivot axis of said pivotal disc.

* * * * *